US012803018B2

(12) United States Patent
Ancimer

(10) Patent No.: US 12,803,018 B2
(45) Date of Patent: Nov. 17, 2026

(54) SYSTEMS AND METHODS FOR IN SITU CALIBRATION OF FUEL CELL SENSOR

(71) Applicant: CUMMINS INC., Columbus, IN (US)

(72) Inventor: Richard J. Ancimer, Toronto (CA)

(73) Assignee: CUMMINS INC., Columbus, IN (US)

( * ) Notice: Subject to any disclaimer, the term of this patent is extended or adjusted under 35 U.S.C. 154(b) by 244 days.

(21) Appl. No.: 18/840,364

(22) PCT Filed: Mar. 8, 2022

(86) PCT No.: PCT/US2022/019323

§ 371 (c)(1),
(2) Date: Aug. 21, 2024

(87) PCT Pub. No.: WO2023/172249

PCT Pub. Date: Sep. 14, 2023

(65) Prior Publication Data

US 2025/0174686 A1 May 29, 2025

(51) Int. Cl.

| | |
|---|---|
| ***H01M 8/04*** | (2016.01) |
| ***G01K 3/14*** | (2006.01) |
| ***G01K 15/00*** | (2006.01) |
| ***G01L 13/00*** | (2006.01) |
| ***G01L 27/00*** | (2006.01) |
| ***H01M 8/0432*** | (2016.01) |
| ***H01M 8/0438*** | (2016.01) |

(52) U.S. Cl.

CPC .......... *H01M 8/04432* (2013.01); *G01K 3/14* (2013.01); *G01K 15/005* (2013.01); *G01L 13/00* (2013.01); *G01L 27/005* (2013.01); *H01M 8/0432* (2013.01); *H01M 2250/20* (2013.01)

(58) Field of Classification Search

CPC ........... H01M 8/04432; H01M 8/0432; H01M 2250/20; H01M 8/04104; H01M 8/04783; H01M 8/04753; G01K 3/14; G01K 15/005; G01L 13/00; G01L 27/005

See application file for complete search history.

(56) References Cited

U.S. PATENT DOCUMENTS

| | | | | |
|---|---|---|---|---|
| 6,730,424 | B1 | 5/2004 | He et al. | |
| 9,444,111 | B2 * | 9/2016 | Ichikawa | H01M 8/045 |
| 2006/0029840 | A1 | 2/2006 | Goebel | |
| 2007/0026276 | A1 | 2/2007 | Ogawa et al. | |
| 2008/0118783 | A1 * | 5/2008 | Cetegen | H01M 8/0271 429/432 |
| 2009/0274940 | A1 * | 11/2009 | Morita | H01M 8/0263 429/424 |

(Continued)

OTHER PUBLICATIONS

PCT Search Report and Written Opinion prepared for PCT Application No. PCT/US2022/019323, mailed Jun. 15, 2022.

*Primary Examiner* — Francis C Gray

(74) *Attorney, Agent, or Firm* — Barnes & Thornburg LLP

(57) ABSTRACT

Embodiments of the present disclosure include a vehicle or powertrain with a fuel cell stack system including a first fuel flow stream and a second fuel flow stream mixing to form a third fuel flow stream. the third fuel flow stream flowing through an anode including an anode inlet and an anode outlet in a fuel cell stack. a first air flow stream flowing through a cathode including a cathode inlet and a cathode outlet in the fuel cell stack. at least two physical or virtual sensors located in the system, and a controller.

17 Claims, 1 Drawing Sheet

(56) References Cited

U.S. PATENT DOCUMENTS

| | | | | |
|---|---|---|---|---|
| 2010/0266923 | A1* | 10/2010 | Mcelroy | H01M 8/04798<br>429/444 |
| 2011/0195324 | A1* | 8/2011 | Zhang | H01M 8/0662<br>429/413 |
| 2013/0089801 | A1* | 4/2013 | Takeshita | H01M 8/04104<br>429/446 |
| 2018/0191009 | A1* | 7/2018 | Palumbo | B01J 12/007 |

* cited by examiner

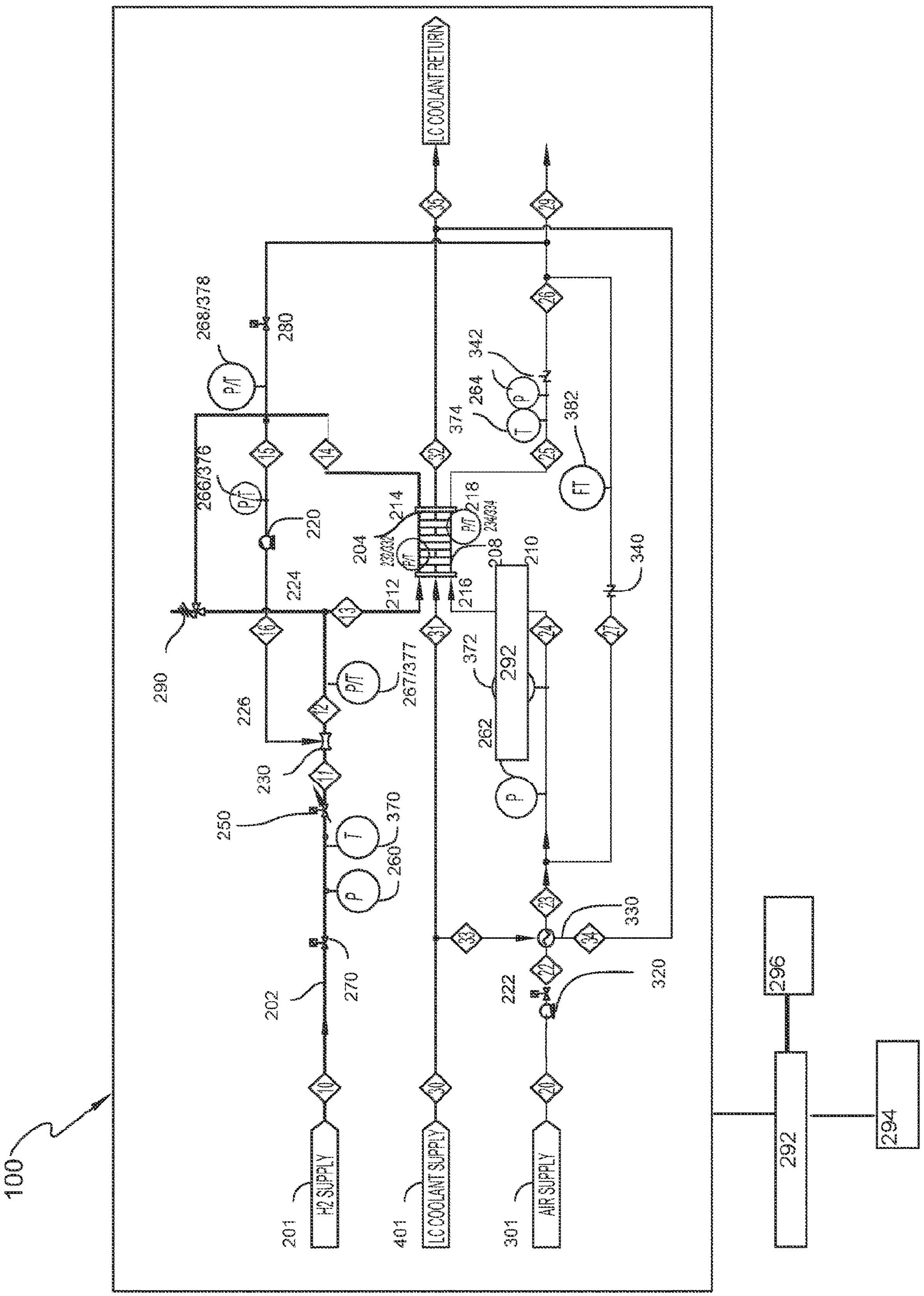
100
H2 SUPPLY
LC COOLANT SUPPLY
AIR SUPPLY
LC COOLANT RETURN
201
401
301
202
270
260
370
250
230
226
290
224
220
266/376
268/378
280
267/377
212
204
214
218
216
208
210
292
262
372
222
320
330
374
264
342
362
340
296
294

SYSTEMS AND METHODS FOR IN SITU CALIBRATION OF FUEL CELL SENSOR

CROSS-REFERENCE TO RELATED APPLICATIONS

This application is a U.S. national stage entry under 35 U.S.C. § 371(b) of PCT International Application No. PCT/US2022/019323, filed Mar. 8, 2022, the entire disclosure of which is incorporated herein by reference.

TECHNICAL FIELD

The present disclosure relates to systems and methods for optimizing in situ calibration of pressure of temperature sensors in fuel cells or fuel cell stacks.

BACKGROUND

Vehicles and/or powertrains use fuel cells or fuel cell stacks for their power needs. A fuel cell and/or fuel cell stack may include, but are not limited to a phosphoric acid fuel cell (PAFC), a molten carbonate fuel cell (MCFC), a proton exchange membrane fuel cell, also called a polymer exchange membrane fuel cell (PEMFC), or a solid oxide fuel cell (SOFC). A fuel cell or fuel cell stack may generate electricity in the form of direct current (DC) from electrochemical reactions that take place in the fuel cell or fuel cell stack.

A fuel processor converts fuel into a form usable by the fuel cell or fuel cell stack. If the fuel cell or fuel cell stack is powered by a hydrogen-rich, conventional fuel, such as methanol, gasoline, diesel, or gasified coal, a reformer may convert hydrocarbons into a gas mixture of hydrogen and carbon compounds, or reformate. The reformate may then be converted to carbon dioxide that is purified and recirculated back into the fuel cell or fuel cell stack.

Fuel, such as hydrogen or a hydrocarbon, may be channeled through field flow plates to the anode on one side of the fuel cell or fuel cell stack, while oxygen from the air is channeled to the cathode on the other side of the fuel cell or fuel cell stack. At the anode, a catalyst, such as a platinum catalyst, causes the hydrogen to split into positive hydrogen ions (protons) and negatively charged electrons. In the case of a polymer exchange membrane fuel cell (PEMFC), the polymer electrolyte membrane (PEM) permits the positively charged ions to flow through the PEM to the cathode. The negatively charged electrons are directed along an external loop to the cathode, creating an electrical circuit and/or an electrical current). At the cathode, the electrons and positively charged hydrogen ions combine with oxygen to form water, which flows out of the fuel cell or fuel cell stack.

Fuel stream is exhausted from a fuel cell or fuel cell stack outlet and recirculated back to the anode through an anode inlet. The recirculation of the fuel stream exhaust back to the anode inlet includes both fuel and water. The recirculation rate is based on specified excess fuel targets such as excess fuel ratio or entrainment ratio (ER). The entrainment ratio (ER) is defined as the ratio of mass flow rate of the low pressure stream (e.g., the secondary mass flow rate) to the mass flow rate of the high pressure stream (e.g., the primary mass flow rate).

Fuel targets for a system may be specified as a minimum level of excess fuel required by the fuel cell or fuel cell stack based on the operating conditions of the fuel cell or fuel cell stack. A fuel cell or fuel cell stack may have an excess fuel level higher than the minimum level defined by the excess fuel target, but achieving that higher level may result in a high parasitic load on the fuel cell or fuel cell stack. For example, an excess fuel level higher than the minimum excess fuel level may be achieved by maintaining high fuel flow rates at the anode which may lead to pressure loss in the fuel cell or fuel cell stack.

Currently, there are no methods or systems that enable a fuel management system to directly measure the excess fuel level in a system comprising a fuel cell or a fuel cell stack. A fuel cell power module may use measurements of a pressure differential ($\Delta P$) or a temperature differential ($\Delta T$) at different locations on the fuel cell or fuel cell stack to determine the state of the fuel cell or fuel cell stack system state. However, $\Delta P$ and $\Delta T$ sensors are not readily available for use in a hydrogen fuel environment. Two separate sensors are necessary to measure pressure or temperature at the two different locations respectively. The difference between the two sensors is used to measure the small difference (delta) of pressure or temperature, respectively that may be present. Such standard methods have a high uncertainty due to propagation of errors.

The present disclosure is directed to systems and methods that take advantage of an existing operating state of a fuel cell or fuel cell stack to calibrate the two pressure and/or temperature sensors prior to measuring the small differences to minimize propagation of errors (e.g., $\Delta P$ and $\Delta T$). The two or more sensors may be calibrated in situ such that any existing measurement biases are minimized. Thus, the present disclosure is directed to implementing robust controls of the measurements made by pressure and/or temperature sensors to improve the ability to measure system operating states, to control the system, and/or to diagnose system operating states in order to resolve any problems or faults identified therein.

SUMMARY

Embodiments of the present disclosure are included to meet these and other needs. In one aspect, is a vehicle or powertrain with a fuel cell stack system including a first fuel flow stream and a second fuel flow stream mixing to form a third fuel flow stream, the third fuel flow stream flowing through an anode including an anode inlet and an anode outlet in a fuel cell stack, a first air flow stream flowing through a cathode including a cathode inlet and a cathode outlet in the fuel cell stack, at least two physical or virtual sensors located in the system, and a controller. The at least two physical or virtual sensors may be calibrated in situ by the controller.

The at least two physical or virtual sensors may be pressure sensors and may be used to measure pressure difference across the anode of the fuel cell stack, across a blower, across one or more ejector, or across a bypass valve. The at least two physical or virtual sensors may be used to measure pressure difference across the cathode of the fuel cell stack. The at least two physical or virtual sensors may be used to measure pressure difference between the cathode and the anode of the fuel cell stack.

The at least two physical or virtual sensors may be temperature sensors. The at least two physical or virtual sensors may be used to measure temperature difference between the first fuel flow stream and the third fuel flow stream, between the second fuel flow stream and the third fuel flow stream, or between the first air flow stream and the second air flow stream. The at least two physical or virtual sensors include a first sensor and a second sensor, and the first sensor and second sensor may be calibrated by comparing the measurements made by both sensors under the same pressure or temperature.

The at least two physical or virtual sensors include a first sensor and a second sensor, and the first sensor and second sensor may be located on the anode and may be calibrated during nitrogen blanketing procedure. The at least two physical or virtual sensors include a first sensor and a second sensor, and the first sensor and second sensor may be located on the cathode and may be calibrated during nitrogen blanketing procedure. The at least two physical or virtual sensors include a first sensor and a second sensor, and the first sensor may be located on the anode and the second sensor may be located on the cathode and both sensors may be calibrated across the anode and cathode during nitrogen blanketing procedure.

The system may further include a battery, and the controller may determines a calibration operating state of the system. The calibration operating state may include the battery powering the vehicle or powertrain and the controller calibrating the at least two physical or virtual sensors.

In another aspect is a method of calibrating sensors in a vehicle or powertrain with a fuel cell stack system including flowing a first fuel flow stream and a second fuel flow stream that are mixed to form a third fuel flow stream, flowing the third fuel flow stream through an anode comprising an anode inlet and an anode outlet in a fuel cell stack, flowing a first air flow stream through a cathode comprising a cathode inlet and a cathode outlet in the fuel cell stack, and calibrating least two physical or virtual sensors in situ by a controller. The system may include at least two physical or virtual sensors.

The vehicle of powertrain employing the method of calibrating sensors may include a first pressure sensor and a second pressure sensor located on the anode or on the cathode and calibrated during nitrogen blanketing procedure.

The method of calibrating sensors may further include increasing cathode side pressure, flowing the first fuel flow stream into the anode to achieve a target anode-cathode pressure, comparing measurements made by the first pressure sensor and the second pressure sensor when the flow rate of the first fuel flow stream drops below a threshold value, and calibrating the first pressure sensor and the second pressure sensor by the controller as the cathode side pressure is reduced.

The method of calibrating sensors may further include closing a backpressure valve to increase cathode pressure to a high operating pressure of about 2.5 bara, shutting off a compressor or a bypass valve, flowing the first fuel flow stream into the anode, reducing the flow rate of the first air flow stream to about zero to achieve a target anode-cathode pressure, calibrating the at least two pressure sensors by the controller at the high operating pressure of about 2.5 bara, allowing a small leakage from the cathode, reducing cathode pressure form the high operating pressure of about 2.5 bara to a low operating pressure of about 1.5 bara, and calibrating the at least two pressure sensors by the controller across a full operating pressure range while fuel cell stack voltage decays.

The method of calibrating sensors may further include shutting down the fuel cell system, allowing the anode and the cathode to get to an equilibrium pressure, restarting the fuel cell stack, reading the at least two pressure sensors without disturbing the equilibrium pressure, calibrating the at least two pressure sensors against each other, and checking calibration of the at least two pressure sensors at an operating pressure of about 2.5 bara.

The method of calibrating sensors may further include a battery powering the vehicle or powertrain and calibrating the at least two physical or virtual sensors. The method of calibrating sensors may further include setting the flow rate of the first air flow stream to about a zero, identifying operating conditions when the flow rate of the first air flow stream is about zero, measuring pressure at the location of the at least two pressure sensors, allowing pressure at the location of the at least two pressure sensors to decay from about 2.5 bara to about 1.5 bara, and calibrating the at least two pressure sensors by the controller to have zero offset at the identified operating conditions when the flow rate of the first air flow stream is about a zero.

BRIEF DESCRIPTION OF THE DRAWINGS

These and other features, aspects, and advantages of the present disclosure will become better understood when the following detailed description is read with reference to the accompanying drawings, in which like characters represent like parts throughout the drawings, wherein:

FIG. 1 is a schematic of one embodiment of a fuel cell stack system.

DETAILED DESCRIPTION

The present disclosure relates to systems and methods of calibrating two or more sensors in situ such that any existing biases in sensor measurements are minimized. The present disclosure is directed to implementing robust controls of the measurements made by pressure and/or temperature sensors to improve the ability to determine system operating states, to control the system, and/or to diagnose system operating states.

FIG. 1 illustrates an embodiment of a fuel cell stack system 100 comprising a fuel cell stack 210, a control valve 250, and a recirculation pump or blower 220 in series or in parallel to the fuel cell stack 210. The system 100 also comprises an exhaust valve 280, a hydrogen supply or shut off valve 270, a pressure transfer valve 290, a purge exhaust valve 282, one or more pressure sensors or transducers 260, 262, 264, 266, 267, 268, 232, 234, one or more temperature sensors 370, 372, 374, 376, 377, 378, 332, 334, one or more flow transducers 382, a venturi or ejector 230, an air compressor 320, a cooler 330, a backpressure valve 342, a bypass valve 340. In other embodiments, there may also be one or multiple valves, sensors, compressors, filters, regulators, blowers, injectors, ejectors, and/or other devices in series or in parallel with the fuel cell stack 210.

The system 100 may further comprise one or more fuel cell stacks 210 or one or more fuel cells. A fuel cell and/or fuel cell stack 210 of the present system 100 or method may include, but are not limited to a phosphoric acid fuel cell (PAFC), a molten carbonate fuel cell (MCFC), a proton exchange membrane fuel cell, also called a polymer exchange membrane fuel cell (PEMFC), or a solid oxide fuel cell (SOFC). An exemplary system 100, fuel cell stack 210 or fuel cell is a PEMFC.

A system 100 comprising a fuel cell stack 210 may comprise a control valve. The control valve 250 may be a mechanical regulator (e.g., a dome regulated mechanical regulator), a proportional control valve, or an injector. The control valve 250 may comprise an inner valve, a coil, a solenoid, or a different mechanical element that controls the opening or closing of the control valve 250.

The control valve 250 may be a proportional control valve that is used to control the flow of fresh fuel 202, 10 to the anode 204. Fresh fuel 202, 10 is also referred to as primary flow, primary mass flow, primary fuel, or motive flow. In some embodiments, the control valve 250 may be a mechanical regulator. The pressure differential between the gas streams (e.g. anode inlet flow 13 and cathode inlet flow 24) at the anode 204 and the cathode 208 provides an input signal to control the mechanical regulator.

When the hydrogen supply valve 270 is switched on, fuel 202, 10 from the fuel supply 201 flows through the control valve 250 and enters the venturi or ejector 230 as a regulated fuel flow stream 11. A pressure sensor or transducer 260 measures the pressure in the fuel stream 10. The anode inlet flow 13 exits the venturi or ejector 230 and flows through the anode 204 of the fuel cell stack 210.

Typically, the anode inlet flow 13 is a mixture of fresh fuel (e.g., $H_2$) and anode exhaust (e.g., $H_2$ fuel and/or water). Conversely, oxidant (e.g., air, oxygen, or humidified air) flows through the cathode 208 of the fuel cell stack 210. The anode inlet flow 13 enters the fuel stack 210 where a portion of the fuel in the anode stream may be consumed. The unconsumed fuel portion exits the fuel cell stack 210 as the anode outlet flow 14.

The venturi or ejector 230 may take advantage of the available excess exergy from the regulated fuel flow stream 11 to draw in the secondary flow 226, 16. Therefore, the venturi or ejector 230 works against the pressure losses through an anode gas recirculation (AGR) loop 224. The secondary flow 226, 16, also referred to as secondary mass flow, entrainment flow, or recirculation flow, enters the venturi or ejector 230 using a flow pressure across the AGR loop 224.

The AGR loop 224 includes the venturi or ejector 230, the fuel cell stack 210, the recirculation pump or blower 220, and/or other piping, valves, channels, manifolds associated with the venturi or ejector 230, and/or the fuel cell stack 210. In one embodiment, the recirculation pump or blower 220 may be used to achieve the excess fuel ratio required by the system 100. Recirculated inlet fuel stream 15 enters the recirculation pump or blower 220 through the exhaust valve 280 and exits as the secondary flow 226, 16 before entering the venturi or ejector 230.

In one embodiment of the present system 100, air 20 from the air supply 301 passes through the compressor 320 to form a compressed air stream 22. The compressed air stream 22 passes through the cooler 330 to form a filtered air stream 23. The filtered air stream 23 may either flow as cathode inlet flow 24 into the fuel cell stack 210 or as the bypass inlet flow stream 27 through the bypass valve 340. The cathode outlet flow 25 may exit the fuel cell stack 210 at the cathode outlet 218, further exit the backpressure valve 342 as the backpressure valve outlet flow 26, and then combine with the bypass outlet flow stream 27 to exit the fuel cell stack 210 as the exhaust stream 29.

A part of a coolant stream 30 from a coolant supply 401, a coolant input stream 33, passes through the cooler 330 to form a coolant stream 34. A part of a the coolant stream 30 from the coolant supply 401, the coolant stack inlet stream 31, passes through the fuel cell stack 210 and exits as coolant stack outlet stream 32. The coolant stack outlet stream 32 joins the coolant stream 34 to form a coolant return stream 35.

The anode 204 and/or cathode 208 of the fuel cell stack 210 may communicate with a controller 292 via a signal. The signal may be a physical signal, a virtual signal, or an electronic signal. In some embodiments, the virtual signal may be any type of communicative or computer based signal known in the art. The physical signal may be transmitted by a physical energy like pressure, temperature, or a mechanical force.

In some embodiments, the signal may be determined by an intermediary signal measured by a separate or substitutionary measurement (e.g., pressure). For example, the primary fuel flow rate or primary flow rate may be controlled to match the fuel consumption in the fuel cell stack 210 based on an operating pressure (e.g., an anode pressure) that is used as the intermediary signal. This intermediary signal, which dictates the primary fuel flow rate, eventually affects the generation of the signal that the controller 292, the anode 204 and/or cathode 208 use for communication with each other.

The pressure in the anode 204 may stabilize when fuel consumption matches the fresh fuel feed at the anode 204, assuming that all other system parameters are equal. If the control valve 250 is a proportional control valve, functioning of the control valve 250 is based on a target pressure differential between the anode 204 and cathode 208. In some embodiments, the pressure at the cathode 208 is controlled and/or maintained at a target level via cathode side controls.

In other embodiments, the system 100 may need to control pressure between the cathode 208 and the anode 204. Controlling the ratio of cathode to anode pressure enables the prevention, reduction, or avoidance of high mechanical stresses on the membrane electrode assembly (MEA) fuel cell stack 210. Controlling this pressure also reduces or prevents gas cross over from cathode 208 to anode 204 and/or anode 204 to cathode 208.

In some embodiments, a mechanically regulated approach may be used to control and/or regulate the cathode to anode pressure. Mechanical regulation of the cathode 208 and/or anode 204 pressure of the fuel cell system 100 may include employing actuators. Such regulation may use pressure signals from the cathode/air inlet 216 to control air mass flow. Mechanical regulation may maintain the appropriate pressure on the cathode 208 side of the fuel cell stack 210.

The control valve 250 may be a mechanical regulator and pressure signals from the cathode 208 side may be used as inputs to the control valve 250 The present system and method may comprise mechanical regulation of the anode 204 side in addition to and/or in lieu of the cathode 208 side. For example, the anode 204 side mass flow through the proportional control valve 250 and anode 204 side pressure may be controlled by using the pressure signals from the cathode 208 side and/or measuring one or more anode 204 side conditions.

The system 100 may require a target water or humidity level, which may dictate the saturated secondary flow 226. The water content of the secondary flow 226 may influence the target excess fuel ratio. The secondary flow 226 may drive the primary flow 202, 10, such that the target excess fuel ratio ($\lambda$) may be dependent on the target water or humidity level.

Physical or virtual sensing systems or methods may be used to decrease the uncertainty in the measured entrainment ratio (ER) or excess fuel ratio. Virtual sensing systems may communicate through virtual signals (e.g., computer signals). In some embodiments, the physical or virtual sensing systems or methods may comprise pressure sensors 260, 262, 264, 266, 267, 268, 232, 234. The pressure sensors 260, 262, 264, 266, 267, 268, 232, 234 may be monitored and/or controlled by a controller 292.

The mass flow rate (m) of a gas or fuel ($H_2$) stream in a fuel cell system 100 is a function of pressure loss or a pressure differential ($\Delta P$) across an element or component of the system 100 (e.g., fuel stack 210, recirculation pump or blower 220, venturi or ejector 230) through which the gas stream flows. Pressure sensors 260, 262, 264, 266, 267, 268, 232, 234 may be used to determine a pressure differential (ΔP) across one or more system components (e.g., fuel stack 210, recirculation pump or blower 220, venturi or ejector 230).

The calculated pressure differential (ΔP) is used to determine the flow rates of the primary flow stream 202 and of the recirculation flow stream 226. The density (ρ) of the gas stream is estimated based on the pressure (P) in the gas stream, the temperature (T) of the gas stream, and an average gas constant (R) of the gas stream. The gas stream may be the primary flow stream 202 or the recirculation flow stream 226 in the system 100. The uncertainty associated with the volumetric flow rate at an anode manifold inlet of the system 100 may be addressed and/or enabled by the ability to measure the pressure differential across the anode inlet manifold 304 or anode inlet 212 ($\Delta P_{AIM}$).

Pressure sensors 232 may also be used to determine a pressure differential (ΔP) across the anode 204 (i.e. the pressure difference between the anode inlet flow 13 and anode outlet flow 14). Alternatively or additionally, pressure sensors 262, 264, 234 may be used to determine a pressure differential (ΔP) across the cathode 208 i.e. the pressure difference between the cathode inlet flow 24 and cathode outlet flow 25. In some other embodiments, pressure sensors 260, 266, 268 may be used to determine a pressure differential (ΔP) across the recirculation pump or blower 220, i.e. the pressure difference between the recirculated inlet fuel stream 15 and secondary flow 16.

Pressure sensors 232, 234 may be used to determine a pressure differential (ΔP) between the anode 204 and the cathode 208. In some other embodiments, pressure sensors 260, 267 may be used to determine a pressure differential (ΔP) across the venturi or ejector 220, i.e. the pressure difference between the regulated fuel flow stream 11 and ejector 230 outlet flow 12. In other embodiments, pressure sensors 267, 232 may be used to determine a pressure differential (ΔP) across the venturi or ejector 220, i.e. the pressure difference between which is the anode inlet flow 13 and ejector 230 outlet flow 12.

The physical or virtual sensors may comprise temperature sensors 370, 372, 374, 376, 377, 378, 332, 334. The temperature sensors 370, 372, 374, 376, 377, 378, 332, 334 may be monitored and/or controlled by a controller 292. The temperature sensor 370, 372, 374, 376, 377, 378, 332, 334 may measure a temperature difference across a mixing point in the system.

Temperature difference across the mixing point may be used by the controller 292 to determine an entrainment ratio of the system 100 using energy balance in the system 100. In some embodiments of the system, the temperature difference across the mixing point may be maximized. Temperature sensors 370, 3776 may measure the temperature difference between the regulated fuel flow stream 11 and the venturi or ejector 230 outlet flow 12. Temperature sensors 376, 377, 370 may measure a temperature difference between the secondary flow 16 and the venturi or ejector 230 outlet flow 12.

Inaccurate pressure measurements by pressure sensors 260, 262, 264, 266, 267, 268, 232, 234 or by temperature sensors 370, 372, 374, 376, 377, 378, 332, 334 across the fuel stack 210, the recirculation pump or blower 220, and/or the venturi or ejector 230 may result in error propagation. Two or more sensors 260, 262, 264, 266, 267, 268, 232, 234, 370, 372, 374, 376, 377, 378, 332, 334 across the fuel stack 210, the recirculation pump or blower 220, and/or the venturi or ejector 230 may be compared while measuring the same pressure or temperature state to remove bias between the sensors. In other embodiments, additional or alternate pressure or temperature sensors may be placed at separate or different locations in the fuel cell system 100 that are not shown in FIG. 1.

The response of the two or more sensors 260, 262, 264, 266, 267, 268, 232, 234, 370, 372, 374, 376, 377, 378, 332, 334 across the fuel stack 210, the recirculation pump or blower 220, and/or the venturi or ejector 230 may be checked at two or more conditions included in the expected pressure or temperature range. For example, the response of the two or more pressure sensors 260, 262, 264, 266, 267, 268, 232, 234 or temperature sensors 370, 372, 374, 376, 377, 378, 332, 334 may be compared when there is zero fuel flow 10 or air flow 20. Two or more temperature sensors 370, 372, 374, 376, 377, 378, 332, 334 may be compared when there is no expected change in temperature. Alternatively, if the conditions are reliably known, then the sensors 260, 262, 264, 266, 267, 268, 232, 234, 370, 372, 374, 376, 377, 378, 332, 334 may be calibrated against one another at the known state.

The sensors 260, 262, 264, 266, 267, 268, 232, 234, 370, 372, 374, 376, 377, 378, 332, 334 may be calibrated in situ, meaning the sensors may be calibrated at their operating locations in the fuel cell system 100. The sensors 260, 262, 264, 266, 267, 268, 232, 234, 370, 372, 374, 376, 377, 378, 332, 334 may be calibrated by the controller 292 during nitrogen blanketing procedures. The purpose of a nitrogen blanketing procedure is to blanket the anode 204 with nitrogen to minimize fuel cell stack 210 aging due to high half-cell voltages during shut down.

Reduced effectiveness of the fuel cell stack 210 shutdown process may negatively affect fuel cell stack 210 aging. During nitrogen blanketing, the current demand is set to zero, the air compressor 320 speed is set to zero, the air backpressure valve 342 and bypass valve 340 are closed, the hydrogen pressure control remains enabled, the hydrogen supply valve 270 is cycled on/off to allow hydrogen flow to continue in such a way to avoid low stack voltage shut off, and a resistor is applied across the fuel cell stack 210 to enable current to flow.

During the nitrogen blanketing procedure the response of the fuel cell stack 210 may comprise the controller 292 instructing different components of the fuel cell system 100. The controller 292 may instruct the fuel cell stack to stop the flow of fresh air 20 to the cathode 208. As the air remains trapped in a bulk static state, the oxygen in the cathode 208 is consumed by electrochemical reactions. Some oxygen may be drawn into the fuel cell stack 210 by a slow diffusion process. The cell voltage decay may decrease as the oxygen concentration in the fuel cell stack 210 decreases.

The response of the fuel cell stack 210 may further comprise the controller 292 continuing to feed fresh hydrogen into the anode 204 and thus, controlling the pressure difference between the cathode 208 and the anode 204. The hydrogen supply is needed to continue the consumption of oxygen at the cathode 208. Once the fuel cell stack 210 voltage drops below a voltage threshold level, the fresh hydrogen flow 10 may be disabled by the controller 292, and the hydrogen supply valve 270 may be fully closed by the controller 292.

The controller 292 may then power down system 100. In some embodiments this process may be in the order of minutes. The voltage threshold level may be chosen based on the characteristics of the fuel cell stack 210 determined to represent an operating state with low partial pressure at the cathode 208.

Even after the initiation of the shutdown process, the hydrogen on the anode side 204 may continue to be consumed. Oxygen may slowly diffuse to the cathode 208 side even when the air supply 310 is shut down. Alternatively, there may be stored oxygen at the cathode 208 side that may diffuse through the MEA and be available for consumption at the anode 204 side. This may result is a slow drop in pressure on the anode 204 side. Once all oxygen is consumed, nitrogen diffuses across the membrane comprised by the MEA to balance the pressure across the anode 204 and the cathode 208.

In some embodiments, this process of nitrogen blanketing may be performed and/or completed in the order of hours. For example, this nitrogen blanketing process may be performed in a range of about 30 mins to 48 hours, including any specific or range of times comprised therein. Notably, the time for nitrogen blanketing depends on and is impacted by the operating conditions of the fuel cell stack 210.

A method to calibrate pressure sensors 260, 262, 264, 266, 267, 268, 232, 234 may include the controller 292 calibrating the pressure sensors 262, 264, 234 on the cathode 208 side. The pressure sensors 262, 264, 234 on the cathode 208 side may be calibrated to ensure minimal error propagation when measuring change in pressure (ΔP). In some embodiments, as part of the shutdown process, the backpressure valve 342 may be closed by the controller 292 to boost the cathode manifold pressure to a pressure representative of high pressure operating point (e.g., about 2.5 bara). Additionally, the air compressor 320 may be shut off, the backpressure valve 342 may be fully closed, and/or the bypass valve 340 may be fully closed to seal the cathode side of the system. An off valve 222 may be used upstream or downstream of the air compressor 320 to seal the system 100.

Fresh hydrogen may continue to be fed to the fuel cell stack 210 by the controller 292. The controller 292 may stop air flow through cathode 208, such as closing one or more valves such that the air flow is zero. The pressure sensors 262, 264, 234 may be calibrated against one other based on measurements made by each sensor at a high pressure operating point (e.g., about 2.5 bara to about 3.0 bara, including any specific or range of pressure comprised therein). In some embodiments, a very small leakage may be allowed to flow out of the cathode 208, reducing the pressure from the high pressure operating point (e.g., about 2.5 bara to about 3.0 bara) to a low pressure operating point (e.g., about 1.0 bara to 1.5 bara). The amount of leakage allowed may be dependent on the characteristics of the fuel cell stack 210 and the operating conditions of the system 100.

A leakage flow rate may be set to be very low such that the pressure difference between the two sensors 262, 264 may be very low for example, to less than 5 kPa, or less than 1 kPa, including any specific or range of pressure comprised therein). For example, leakage may occur over a time period of about 60 seconds. Pressure measurements may be affected by disturbance of air in the fuel cell stack 210. The controller 292 may use the backpressure valve 342 and bypass valve 340 to minimize disturbance of the air in the fuel cell stack 210.

The controller 292 may calibrate the pressure sensors 260, 262, 264, 266, 267, 268, 232, 234 against one another across the full pressure operating range while the fuel cell stack 210 voltage decays. The calibration may be communicated by the controller 292 to a processor 294 or a different controller 292, and implemented during a start-up of a consecutive system 100 or fuel cell stack 210. The pressure sensor calibration may be checked to ensure that the values are not changed beyond a pre-defined range.

For example, a calibration threshold may be applied to limit the maximum change allowed for any one sensor calibration level. Alternatively, an exponentially weighted moving average calculation may be applied to limit the rate of propagation of undesired calibration changes. These calibration thresholds may be different than an initial calibration threshold.

The initial calibration threshold may be set to allow the offset to reach an equilibrium value during the early life of the system 100. The calibration threshold may be reset to the initial calibration threshold if usage results in a new sensor set replacing any of the old sensors. The calibration threshold may also determine any correction for calibration. The correction may be reset to zero when a new sensor set is installed. The calibration threshold and the initial calibration threshold may be determined based on the characteristics of the fuel cell stack 210 and operating conditions of the system 100.

A method to calibrate pressure sensors 260, 262, 264, 266, 267, 268, 232, 234 may comprise the controller 292 calibrating the pressure sensors 260, 266, 267, 268, 232 on the anode 204 side. In some embodiments, with the increase in cathode 208 side pressure, the controller may flow fresh hydrogen into the anode manifold to achieve a target anode 204 and cathode 208 pressure differential or a target anode-cathode pressure. In other embodiments, once the fresh hydrogen flow 10 rate drops below a minimum flow threshold value, determined based on the characteristics of the fuel cell stack 210 and operating conditions of the system 100, the controller 292 may compare and/or calibrate the pressure sensors 260, 266, 267, 268, 232. The operating pressure may be a high operating pressure of about 1.5 bara to about 2.5 bara, or about 2.5 bara to about 3 bara, or any value or range comprised within these ranges.

As the cathode side 208 air pressure is reduced, the hydrogen may be slowly be consumed. The controller 292 may calibrate the pressure sensors 260, 266, 267, 268, 232 against one another based on measurements made by each sensor. In some other embodiments, the controller 292 may preferably shut off the recirculation pump or blower 220 during this shutdown process to minimize the hydrogen flow 16 rate through the fuel cell stack 210. If hydrogen flow 16 is needed to protect the fuel cell stack 210 during the shutdown process, then the controller 292 may operate the recirculation pump or blower 220 at a minimum required flow.

The controller 292 may disconnect any parasitic load on the system 100 for short periods of time to stop the oxygen from being consumed. Disconnecting the parasitic load may stop the flow 10 of fresh hydrogen.

A method to calibrate pressure sensors 260, 262, 264, 266, 267, 268, 232, 234 may comprise the controller 292 calibrating one or more pressure sensors 262, 264, 234 on the cathode 208 side against one or more pressure sensors 260, 266, 267, 268, 232 on the anode 204 side. In some embodiments, the pressure sensors 260, 266, 267, 268, 232 on the anode 204 side and the pressure sensors 262, 264, 234 from the cathode 208 side may be calibrated against each other to ensure minimal error propagation when measuring change in pressure (ΔP) or the pressure differential.

In other embodiments, the controller 292 may use a pressure differential between the anode 204 and the cathode 208 to dictate the rate of flow of the anode inlet flow 13. Calibrating the sensors against one another may minimize bias and/or offsets, which consequently aids in minimizing error propagation in sensor measurements. In one embodiment, the temperature sensors 370, 372, 374, 376, 377, 378, 332, 334 may be similarly calibrated as the pressure sensors 260, 262, 264, 266, 267, 268, 232, 234.

The anode 204 side and the cathode 208 side may be manipulated and/or controlled to obtain an equilibrium pressure. The controller 292 may shut down the fuel cell stack 210 and the pressure on both sides, the anode 204 and the cathode 208 sides, may be allowed to equilibrate. The controller 292 may read or detect measurements of the pressure sensors 260, 266, 267, 268, 232 on the anode 204 side and the pressure sensors 262, 264, 234 on the cathode 208 side when the fuel cell stack 210 is restarted. The controller may also detect sensor measurements before any commands are executed to disturb the pressure equilibrium between the two sides.

The controller 292 may calibrate the sensors 260, 262, 264, 266, 267, 268, 232, 234 against one another if it is determined that the pressure is equilibrated, meaning one sensor may be calibrated to reflect the values and readings of another sensor. The controller 292 may also calibrate the sensors 260, 262, 264, 266, 267, 268, 232, 234 if the fuel cell stack 210 is shut down for longer than about 0.5 hour to about 1 hour, or for longer than about 1 hour to about 2 hours, or for longer than about 2 hours to about 2.5 hours, or for any time or range comprised within those ranges. In some embodiments, the amount of adjustment of the sensors 260, 262, 264, 266, 267, 268, 232, 234 during calibration may be limited and/or unnecessary.

As described above, calibration thresholds may be applied to limit the maximum change in measurements allowed for one calibration level of the sensors 260, 262, 264, 266, 267, 268, 232, 234. Alternatively, an exponentially weighted moving average calculation may be applied to limit the rate of propagation of calibration changes. In other embodiments, multiple shutdowns may be implemented by the controller 292 prior to calibration of the sensors 260, 262, 264, 266, 267, 268, 232, 234. This repeated shutdown may allow sensor calibration at a single low pressure operating point, such as at an operating pressure that ranges from about 1 bara to about 1.5 bara, including any specific or range of pressure comprised therein.

The controller 292 may calibrate sensors 260, 262, 264, 266, 267, 268, 232, 234 against one another at a higher pressure ranging from about 1.5 to about 2.5 bara, including any specific or range of pressure comprised therein. The controller 292 may implement sensor calibration by modifying the nitrogen blanketing method so that when the fuel cell stack 210 is shut off, the pressure is at or about the high pressure operating point (e.g., about 1.5 to about 2.5 bara). The valve and compressor seals need to be sufficient to retain the high pressure for about 0.5 hour to about 1 hours, from about 1 hour to about 2 hours, or from about 2 hours to about 5 hours, or for any time or range of time comprised therein.

The process as described above may be implemented by the controller 292 during fuel cell stack 210 shut down. The high pressure operating point may be attained once the fuel cell stack 210 is powered back on after shutdown. The pressure of the cathode 208 side and the anode 204 side may be the same at the high pressure operating point, and the controller 292 may calibrate the sensors 260, 262, 264, 266, 267, 268, 232, 234 against one another at this higher pressure operating point.

A method to calibrate pressure sensors 260, 262, 264, 266, 267, 268, 232, 234, may comprise the controller 292 calibrating one or more sensors on the same side (i.e. on the anode 204 side or on the cathode 208 side of the fuel cell system 100). The controller 292 may enable a calibration operating state. The calibration operating state may comprise operating a fuel cell power module for a period of time needed to calibrate the sensors independently of any powertrain requirements. The period of time needed to calibrate the sensors may range from about 30 seconds (x) to about 60 s, or from about 1 min to about 2 mins, or from about 2 minutes (min) to about 5 min, or any time or range of time comprised therein. In one embodiment, the temperature sensors 370, 372, 374, 376, 377, 378, 332, 334 may be similarly calibrated as the pressure sensors 260, 262, 264, 266, 267, 268, 232, 234. The system 100 may absorb any electrical power generated by the fuel cell stack 210 and/or power any powertrain or engine comprising the fuel cell stack 210 via energy available in a battery 296. The system 100 may absorb any excess electrical power generated by the fuel cell stack 210 during this calibration phase. For example, the system 100 may also calibrate the sensors if the fuel cell stack 210 generates more energy than the system 100 needs.

If the fuel cell calibration state generates less power than is required by the system 100, the available energy in the battery 296 may be used to power the system 100. In some embodiments, multiple calibration states may be available. If the energy stored in the battery 296 is low, then a higher power calibration state may be chosen. Excess energy is generated and the battery 296 stores the excess energy in a higher power calibration state. If the energy stored in the battery 296 is high, then a lower power calibration state may be chosen. The battery 296 is able to supplement the fuel cell energy in a lower power calibration state.

The fuel cell power module may be operated by the controller 292 to enable calibration of the sensors 260, 262, 264, 266, 267, 268, 232, 234 The controller 292 may set the air flow to near zero at a high pressure (e.g., about 1.5 to about 2.5 bara). The controller 292 may also measure the pressure at two locations (e.g., across anode 204, across cathode 208, across the ejector 230 or blower 220) of the pressure sensors 260, 262, 264, 266, 267, 268, 232, 234. The pressure may be allowed to decay slowly from about 2.5 bara to about 1.2 bara, including any specific or range of pressure comprised therein. The controller 292 may calibrate the sensors 260, 262, 264, 266, 267, 268, 232, 234 to have an offset of about zero under a pre-determined flow rate and temperature. In one embodiment, the temperature sensors 370, 372, 374, 376, 377, 378, 332, 334 may be similarly calibrated as the pressure sensors 260, 262, 264, 266, 267, 268, 232, 234.

Voltage thresholds, calibration thresholds, and flow thresholds may be determined by using look-up maps, pre-determined experimental data, or look-up tables. Voltage thresholds, calibration thresholds, and flow thresholds may be determined manually, automatically, and/or in real-time. As used herein, the phrase “in real-time” refers to the time of occurrence of the associated events, including but not limited to, the time of measurement and collection of data (e.g., sensor data), the time to process the data, and the time of a system 100 and/or its system controller 292 response to the events and the environment based on the data, which occurs instantaneously or substantially instantaneously.

The controller 292 may set the current draw to at or about zero. The controller 292 may shut down the recirculation pump or blower 220 such that there may be no flow through the anode 204. The controller 292 may also calibrate the pressure sensors 260, 262, 264, 266, 267, 268, 232, 234 when the current draw is set to zero. The controller 292 may turn on the recirculation pump or blower 220 and/or may calibrate the pressure sensors 260, 262, 264, 266, 267, 268, 232, 234 when there is no primary fuel flow.

The recirculation pump or blower 220, the bypass valve 340, the backpressure valve 342, the venturi or the ejector 230, the sensors 260, 262, 264, 266, 267, 268, 232, 234, 370, 372, 374, 376, 377, 378, 332, 334, and/or other components of the system 100 may be controlled, regulated, manipulated, and/or monitored by one controller 292. The recirculation pump or blower 220, the bypass valve 340, the backpressure valve 342, the venturi or the ejector 230, the sensors, 260, 262, 264, 266, 267, 268, 232, 234, 370, 372, 374, 376, 377, 378, 332, 334 and/or other components of the system 100 may be controlled, regulated, manipulated, and/or monitored by more than one controller 292.

The one or more controllers 292 for monitoring, regulated, manipulated, and/or controlling the components in the system 100 may be implemented, in some cases, in communication with hardware, firmware, software, or any combination thereof. The hardware, firmware, software, or any combination thereof may be present on or outside the system 100 comprising the fuel cell or fuel cell stack 210. The one or more controller 292 may also control the physical or virtual sensors used in the system 100 may via hardware, firmware, software, or any combination thereof present on or outside the in a system 100 comprising the fuel cell or fuel cell stack 210. Information may be transferred to the one or more controllers using any one or more communication technology (e.g., wired or wireless communications) and associated protocols (e.g., Ethernet, InfiniBand®, Wi-Fi®, Bluetooth®, WiMAX, 3G, 4G LTE, 5G, etc.) to effect such communication.

The one or more controller 292 may be in a computing device. The computing device may be embodied as any type of computation or computer device capable of performing the functions described herein, including, but not limited to, a server (e.g., stand-alone, rack-mounted, blade, etc.), a network appliance (e.g., physical or virtual), a high-performance computing device, a web appliance, a distributed computing system, a computer, a processor-based system, a multiprocessor system, a smartphone, a tablet computer, a laptop computer, a notebook computer, and a mobile computing device.

The following numbered embodiments or any combination of the numbered embodiments are contemplated and are non-limiting.

1. A vehicle or powertrain comprising a fuel cell or fuel cell stack system comprising: (i) a first fuel flow stream and a second fuel flow stream configured to mix to form a third fuel flow stream, (ii) the third fuel flow stream is configured to flow through an anode comprising an anode inlet and an anode outlet in the fuel cell or fuel cell stack, (iii) a first air flow stream configured to flow through a cathode comprising a cathode inlet and a cathode outlet in the fuel cell or fuel cell stack, (iv) at least two physical or virtual sensors located in the system, and (v) a controller.
2. The vehicle or powertrain of clause 1, any other suitable clause, or any combination of suitable clauses, wherein the at least two physical or virtual sensors are calibrated by the controller in situ.
3. The vehicle or powertrain of clause 1, any other suitable clause, or any combination of suitable clauses, wherein the at least two physical or virtual sensors are pressure sensors or temperature sensors.
4. The vehicle or powertrain of clause 3, any other suitable clause, or any combination of suitable clauses, wherein the at least two physical or virtual sensors are used to measure pressure difference across the anode of the fuel cell or fuel cell stack, across a blower, across one or more ejector, or across a bypass valve.
5. The vehicle or powertrain of clause 3, any other suitable clause, or any combination of suitable clauses, wherein the at least two physical or virtual sensors are configured to measure pressure difference across the cathode of the fuel cell or fuel cell stack.
6. The vehicle or powertrain of clause 3, any other suitable clause, or any combination of suitable clauses, wherein the at least two physical or virtual sensors are configured to measure a pressure difference between the cathode and the anode of the fuel cell or fuel cell stack.
7. The vehicle or powertrain of clause 3, any other suitable clause, or any combination of suitable clauses, wherein the at least two physical or virtual sensors are configured to measure a temperature difference between the first fuel flow stream and the third fuel flow stream.
8. The vehicle or powertrain of clause 3, any other suitable clause, or any combination of suitable clauses, wherein the at least two physical or virtual sensors are configured to measure a temperature difference between the second fuel flow stream and the third fuel flow stream.
9. The vehicle or powertrain of clause 3, any other suitable clause, or any combination of suitable clauses, wherein the at least two physical or virtual sensors are configured to measure a temperature difference between the first air flow stream and the second air flow stream.
10. The vehicle or powertrain of clause 3, any other suitable clause, or any combination of suitable clauses, wherein the at least two physical or virtual sensors are calibrated by the controller by comparing the measurements made by both sensors under the same pressure or temperature or under the same pressure or temperature range.
11. The vehicle or powertrain of clause 3, any other suitable clause, or any combination of suitable clauses, wherein the at least two physical or virtual sensors are located on the anode and are calibrated during nitrogen blanketing procedure.
12. The vehicle or powertrain of clause 3, any other suitable clause, or any combination of suitable clauses, wherein the at least two physical or virtual sensors are located on the anode and on the cathode and are calibrated across the anode and cathode during nitrogen blanketing procedure.
13. The vehicle or powertrain of clause 1, any other suitable clause, or any combination of suitable clauses, wherein the system further comprises a battery.
14. The vehicle or powertrain of clause 1, any other suitable clause, or any combination of suitable clauses, wherein the controller enables a calibration operating state.
15. The vehicle or powertrain of clause 14, any other suitable clause, or any combination of suitable clauses, wherein the calibration operating state comprises the battery powering the vehicle or powertrain and the controller calibrating the at least two physical or virtual sensors.

16. A method of calibrating sensors in a vehicle or powertrain comprising a fuel cell or fuel cell stack system comprising: (i) mixing a first fuel flow stream and a second fuel flow stream to form a third fuel flow stream, (ii) flowing the third fuel flow stream through an anode comprising an anode inlet and an anode outlet in the fuel cell or fuel cell stack, (iii) flowing a first air flow stream through a cathode comprising a cathode inlet and a cathode outlet in the fuel cell or fuel cell stack, and (iv) calibrating at least two sensors in situ by a controller.
17. The method of clause 16, any other suitable clause, or any combination of suitable clauses, wherein the at least two sensor are physical sensors or virtual sensors.
18. The method of clause 17, any other suitable clause, or any combination of suitable clauses, wherein the at least two physical or virtual sensors are calibrated by the controller during a nitrogen blanketing procedure.
19. The method of clause 17, any other suitable clause, or any combination of suitable clauses, wherein the at least two physical or virtual sensors are at least two pressure sensors located on the anode and are calibrated by the controller during a nitrogen blanketing procedure.
20. The method of clause 19, any other suitable clause, or any combination of suitable clauses, further comprising: (i) increasing a cathode side pressure, (ii) flowing the first fuel flow stream into an anode manifold to achieve a target anode-cathode pressure, (iii) comparing the at least two pressure sensors by the controller when the flow rate of the first fuel flow stream drops below a threshold value, and (iv) calibrating the at least two pressure sensors by the controller as the cathode side pressure is reduced.
21. The method of clause 17, any other suitable clause, or any combination of suitable clauses, wherein the at least two physical or virtual sensors are at least two pressure sensors located on the cathode and are calibrated during a nitrogen blanketing procedure.
22. The method of clause 21, any other suitable clause, or any combination of suitable clauses, further comprising: (i) closing a backpressure valve to increase a cathode manifold pressure to a high pressure operating pressure of about 2.5 bara, (ii) shutting off a compressor or a bypass valve, (iii) flowing the first fuel flow stream into an anode manifold, (iv) reducing the first air flow stream to about zero to achieve a target anode-cathode pressure, (v) calibrating the at least two pressure sensors by a controller at the high pressure operating pressure of about 2.5 bara, (vi) allowing a small leakage from the cathode, (vii) reducing the cathode manifold pressure from the high pressure operating pressure of about 2.5 bara to a low pressure operating pressure of about 1.5 bara, and (viii) calibrating the at least two pressure sensors by a controller across a full operating pressure range while the fuel cell or fuel cell stack voltage decays.
23. The method of clause 17, any other suitable clause, or any combination of suitable clauses, wherein the at least two physical or virtual sensors are two pressure sensors located on the anode and on the cathode and are calibrated by the controller across the anode and the cathode during the nitrogen blanketing procedure.
24. The method of clause 23, any other suitable clause, or any combination of suitable clauses, wherein the method further comprises: (i) shutting down the fuel cell or fuel cell system, (ii) allowing the anode and the cathode to get to an equilibrium pressure, (iii) restarting the fuel cell or fuel cell stack, (iv) reading the at least two pressure sensors without disturbing the equilibrium pressure, (v) calibrating the at least two pressure sensors by the controller against each other, and (vi) checking calibration of the at least two pressure sensors by the controller at a high operating pressure of about 2.5 bara.
25. The method of clause 14, any other suitable clause, or any combination of suitable clauses, wherein the calibration operating state comprises the battery powering the vehicle or powertrain and the controller calibrating the at least two physical or virtual sensors.
26. The method of clause 25, any other suitable clause, or any combination of suitable clauses, wherein the method further comprises: (i) setting the first air flow stream to about a zero flow rate, (ii) identifying operating conditions when the first air flow stream to about a zero flow rate, (iii) measuring pressure at the location of the at least pressure sensors, (iv) allowing pressure at the location of the at least pressure sensors to decay from about 2.5 bara to about 1.5 bara, and (v) calibrating the at least two pressure sensors by the controller to have zero offset at the identified operating conditions when the first air flow stream to about a zero flow rate.
27. The method of clause 26, any other suitable clause, or any combination of suitable clauses, wherein the method further comprises: (i) setting current draw to about zero, (ii) shutting off a recirculation pump or blower, (iii) ensuring that the first fuel flow stream has a flow rate of about zero, and (iv) calibrating the at least two pressure sensors by the controller.
28. The method of clause 27, any other suitable clause, or any combination of suitable clauses, wherein the method further comprises: (i) setting current draw to about zero, (ii) shutting off a recirculation pump or blower, (iii) ensuring that the first fuel flow stream has a flow rate of about zero, (iv) turning on a recirculation pump or blower, and (v) calibrating at least two temperature sensors by the controller.

The features illustrated or described in connection with one exemplary embodiment may be combined with any other feature or element of any other embodiment described herein. Such modifications and variations are intended to be included within the scope of the present disclosure. Further, a person skilled in the art will recognize that terms commonly known to those skilled in the art may be used interchangeably herein.

As used herein, an element or step recited in the singular and proceeded with the word “a” or “an” should be understood as not excluding plural of said elements or steps, unless such exclusion is explicitly stated. Furthermore, references to “one embodiment” of the presently described subject matter are not intended to be interpreted as excluding the existence of additional embodiments that also incorporate the recited features. Specified numerical ranges of units, measurements, and/or values comprise, consist essentially or, or consist of all the numerical values, units, measurements, and/or ranges including or within those ranges and/or endpoints, whether those numerical values, units, measurements, and/or ranges are explicitly specified in the present disclosure or not.

Unless defined otherwise, technical and scientific terms used herein have the same meaning as is commonly understood by one of ordinary skill in the art to which this disclosure belongs. The terms “first,” “second,” “third” and the like, as used herein do not denote any order or importance, but rather are used to distinguish one element from another. The term "or" is meant to be inclusive and mean either or all of the listed items. In addition, the terms "connected" and "coupled" are not restricted to physical or mechanical connections or couplings, and can include electrical connections or couplings, whether direct or indirect.

Moreover, unless explicitly stated to the contrary, embodiments "comprising," "including," or "having" an element or a plurality of elements having a particular property may include additional such elements not having that property. The term "comprising" or "comprises" refers to a composition, compound, formulation, or method that is inclusive and does not exclude additional elements, components, and/or method steps. The term "comprising" also refers to a composition, compound, formulation, or method embodiment of the present disclosure that is inclusive and does not exclude additional elements, components, or method steps.

The phrase "consisting of" or "consists of" refers to a compound, composition, formulation, or method that excludes the presence of any additional elements, components, or method steps. The term "consisting of" also refers to a compound, composition, formulation, or method of the present disclosure that excludes the presence of any additional elements, components, or method steps.

The phrase "consisting essentially of" or "consists essentially of" refers to a composition, compound, formulation, or method that is inclusive of additional elements, components, or method steps that do not materially affect the characteristic(s) of the composition, compound, formulation, or method. The phrase "consisting essentially of" also refers to a composition, compound, formulation, or method of the present disclosure that is inclusive of additional elements, components, or method steps that do not materially affect the characteristic(s) of the composition, compound, formulation, or method steps.

Approximating language, as used herein throughout the specification and claims, may be applied to modify any quantitative representation that could permissibly vary without resulting in a change in the basic function to which it is related. Accordingly, a value modified by a term or terms, such as "about," and "substantially" is not to be limited to the precise value specified. In some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

It is to be understood that the above description is intended to be illustrative, and not restrictive. For example, the above-described embodiments (and/or aspects thereof) may be used individually, together, or in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A fuel cell system in a vehicle or powertrain comprising:

a first fuel flow stream and a second fuel flow stream mixing to form a third fuel flow stream, the third fuel flow stream flowing through an anode comprising an anode inlet and an anode outlet in a fuel cell stack, a first air flow stream flowing through a cathode comprising a cathode inlet and a cathode outlet in the fuel cell stack, at least two physical or virtual sensors located in the fuel cell system, and a controller, wherein the at least two physical or virtual sensors are pressure sensors that are calibrated in situ by the controller and used to measure pressure difference across the anode of the fuel cell stack, across a blower, across one or more ejector, or across a bypass valve.

2. The system of claim 1, wherein the at least two physical or virtual sensors are used to measure pressure difference across the cathode of the fuel cell stack.

3. The system of claim 1, wherein the at least two physical or virtual sensors are used to measure pressure difference between the cathode and the anode of the fuel cell or fuel cell stack.

4. The system of claim 1, wherein the at least two physical or virtual sensors are temperature sensors.

5. The system of claim 4, wherein the at least two physical or virtual sensors are used to measure temperature difference between the first fuel flow stream and the third fuel flow stream, between the second fuel flow stream and the third fuel flow stream, or between the first air flow stream and the second air flow stream.

6. The system of claim 1, wherein the at least two physical or virtual sensors include a first sensor and a second sensor, and wherein the first sensor and the second sensor are calibrated by comparing measurements made by both sensors under the same pressure or temperature.

7. The system of claim 1, wherein the at least two physical or virtual sensors comprise a first sensor and a second sensor, and wherein the first sensor and second sensor are located on the anode and are calibrated during nitrogen blanketing procedure, or wherein the first sensor and second sensor are located on the cathode and are calibrated during nitrogen blanketing procedure, or wherein the first sensor is located on the anode and the second sensor is located on the cathode and both sensors are calibrated across the anode and cathode during nitrogen blanketing procedure.

8. The system of claim 1, wherein the system further comprises a battery, and wherein the controller determines a calibration operating state of the system.

9. The system of claim 1, wherein the calibration operating state comprises the battery powering the vehicle or powertrain and the controller calibrating the at least two physical or virtual sensors.

10. A method of calibrating sensors in a vehicle or powertrain comprising a fuel cell or fuel cell stack system comprising:

flowing a first fuel flow stream and a second fuel flow stream that are mixed to form a third fuel flow stream,
flowing the third fuel flow stream flowing through an anode comprising an anode inlet and an anode outlet in a fuel cell stack,
flowing a first air flow stream flowing through a cathode comprising a cathode inlet and a cathode outlet in the fuel cell stack, and
calibrating at least two physical or virtual sensors in situ by a controller, wherein the at least two physical or virtual sensors are a first pressure sensor and a second pressure sensor located on the anode and are calibrated during nitrogen blanketing procedure.

11. The method of claim 10, wherein the method further comprises:

increasing cathode side pressure,
flowing the first fuel flow stream into the anode to achieve a target anode-cathode pressure,
comparing measurements made by the first pressure sensor and the second pressure sensor when the flow rate of the first fuel flow stream drops below a threshold value, and
calibrating the at least two pressure sensors by the controller as the cathode side pressure is reduced.

12. The method of claim 10, wherein the at least two physical or virtual sensors are a first pressure sensor and a second pressure sensor located on the cathode and the first pressure sensor and the second pressure sensor are calibrated during nitrogen blanketing procedure.

13. The method of claim 12, wherein the method further comprises:

closing a backpressure valve to increase cathode pressure to a high operating pressure of about 2.5 bara,
shutting off a compressor or a bypass valve,
flowing first fuel flow stream into the anode,
reducing the first air flow stream to about zero to achieve a target anode-cathode pressure,
calibrating the at least two pressure sensors by the controller at the high operating pressure of about 2.5 bara,
allowing a small leakage from the cathode,
reducing cathode manifold pressure from the high operating pressure of about 2.5 bara to a low operating pressure of about 1.5 bara, and
calibrating the at least two pressure sensors by the controller across a full operating pressure range while fuel cell stack voltage decays.

14. The method of claim 10, wherein the at least two physical or virtual sensors are at a first pressure sensor located on the anode and a second pressure sensor located on the cathode and are calibrated across the anode and cathode during nitrogen blanketing procedure.

15. The method of claim 14, wherein the method further comprises:

shutting down the fuel cell system,
allowing the anode and the cathode to get to an equilibrium pressure,
restarting the fuel cell stack,
reading the at least two pressure sensors without disturbing the equilibrium pressure,
calibrating the at least two pressure sensors against each other, and
checking calibration of the at least two pressure sensors at an operating pressure of about 2.5 bara.

16. The method of claim 10, wherein the calibration operating state comprises the battery to powering the vehicle or powertrain and calibrating the at least two physical or virtual sensors.

17. The method of claim 16, wherein the method further comprises:

setting a flow rate of the first air flow stream to about zero,
identifying operating conditions when the flow rate of the first air flow stream is about zero,
measuring pressure at the location of the at least pressure sensors,
allowing pressure at the location of the at least pressure sensors to decay from about 2.5 bara to about 1.5 bara,
calibrating the at least two pressure sensors by the controller to have a zero offset at the identified operating conditions when the flow rate of the first air flow stream is about zero.

* * * * *